United States Patent
Noguchi et al.

(10) Patent No.: US 7,430,809 B2
(45) Date of Patent: Oct. 7, 2008

(54) INCLINATION SENSOR

(75) Inventors: Yoshitaka Noguchi, Saitama (JP); Kenji Ikuta, Saitama (JP); Akihiro Sugeno, Saitama (JP); Mitsuru Kato, Saitama (JP); Masahiro Matsuda, Saitama (JP); Sadayoshi Oshima, Saitama (JP)

(73) Assignee: Toyo Denso Kabushiki Kaisha, Shinbashi, Minato-ku, Tokyo (JP)

( * ) Notice: Subject to any disclaimer, the term of this patent is extended or adjusted under 35 U.S.C. 154(b) by 0 days.

(21) Appl. No.: 11/568,510

(22) PCT Filed: Sep. 30, 2004

(86) PCT No.: PCT/JP2004/014817

§ 371 (c)(1),
(2), (4) Date: Oct. 30, 2006

(87) PCT Pub. No.: WO2006/038297

PCT Pub. Date: Apr. 13, 2006

(65) Prior Publication Data

US 2007/0186427 A1  Aug. 16, 2007

(51) Int. Cl.
*G01C 9/06* (2006.01)
(52) U.S. Cl. .................... 33/366.24; 33/391
(58) Field of Classification Search ............ 33/366.24, 33/366.14, 391–402, 365, 375
See application file for complete search history.

(56) References Cited

U.S. PATENT DOCUMENTS

| | | | | |
|---|---|---|---|---|
| 4,557,056 A | * | 12/1985 | Kim et al. | 33/366.14 |
| 4,703,315 A | * | 10/1987 | Bein et al. | 33/366.24 |
| 6,470,580 B1 | * | 10/2002 | Ushihara et al. | 33/366.24 |
| 7,017,701 B2 | * | 3/2006 | Flynn et al. | 33/366.24 |
| 7,178,377 B2 | * | 2/2007 | Suzuki | 33/391 |
| 2002/0050068 A1 | * | 5/2002 | Katsuki et al. | 33/391 |
| 2006/0137199 A1 | * | 6/2006 | Ikuta | 33/366.24 |

FOREIGN PATENT DOCUMENTS

| | | |
|---|---|---|
| JP | 4-313015 A | 11/1992 |
| JP | 2000-146582 A | 5/2000 |
| JP | 2000-149736 A | 5/2000 |
| JP | 2001-256871 A | 9/2001 |

* cited by examiner

*Primary Examiner*—Yaritza Guadalupe-McCall
(74) *Attorney, Agent, or Firm*—Fulbright & Jaworski LLP

(57) ABSTRACT

Is disclosed an inclination sensor for detecting a tilted state of a case by detecting by a magnetic sensor a magnetized portion of a pendulum type movement mounted rotatably on a shaft in accordance with inclination of the case, wherein the shaft fitted with a clearance in a rotation shaft hole of the movement is further provided at both ends with loosely fitted thereon spacers and mounted in the case. This realizes non-restricted state of both the movement and the shaft. Thus, the movement obtains an improved response characteristic and an increased stability since no oscillation of a running vehicle is transmitted through the shaft to the movement.

1 Claim, 6 Drawing Sheets

INCLINATION SENSOR

TECHNICAL FIELD

The present invention relates to an inclination sensor for sensing an inclination state of a running vehicle body.

BACKGROUND ART

In general, an inclination sensor is used for a safety system of a vehicle, which detects a turnover of the vehicle and, for example, cuts off the feeding of oil and/or switches off the ignition power supply system.

There has been developed an inclination sensor which comprises a case attached to a vehicle body, a pendulum type movement capable of freely rotating in the case in accordance with inclination of the vehicle body and a detector capable of electromagnetically sensing the magnetized part of the movement when a turnover of vehicle occurs (JP 2000-146582 and JP 2001-256871).

The above-mentioned conventional inclination sensor still involves such a problem that the movement of the pendulum is not smooth from the friction of its shaft ends bounded in bearing units of the case. In addition, the movement is directly affected by the oscillation of a running vehicle body since the oscillation may be directly transmitted thereto through the shaft. When the case is tilted in the direction reverse to that of the movement, the movement is stopped by being pressed to a ribbed portion of the case, which is internally formed for restriction of the movement in the axial direction of the movement. Namely, there takes place a so-called "sticking" phenomenon of the movement.

The conventional inclination sensor uses a pendulum type movement having a notched upper part so as to possess its gravity center at the lower side. This causes the movement of the sensor to swing unstably and largely with the oscillation of the running vehicle, decreasing the response of the movement of the sensor.

DISCLOSURE OF INVENTION

It is therefore a primary object of the present invention to provide an inclination sensor for detecting a inclination state of a case by sensing by a magnetic sensor a magnetized portion of a pendulum type movement which can freely rotate in accordance with inclination of the case, wherein a shaft fitted with clearance in a rotation shaft hole of the pendulum is further provided at its both ends with a loosely fitted spacer and is rotatably mounted in supporting portions of the case, thereby the movement and the shaft are both in non-restricted condition and the movement can rotate without being restricted and affected by the oscillation of a running vehicle.

Another object of the present invention is to provide an inclination sensor whose pendulum has an optimal weight ratio of its upper half to lower half about the shaft hole of the pendulum movement, which ratio is predetermined within a range of 1:9 to 3:7 so as to achieve reliable stability of the movement to the oscillation transmittable from a running vehicle.

BEST MODE FOR CARRYING OUT THE INVENTION

Figure 1:
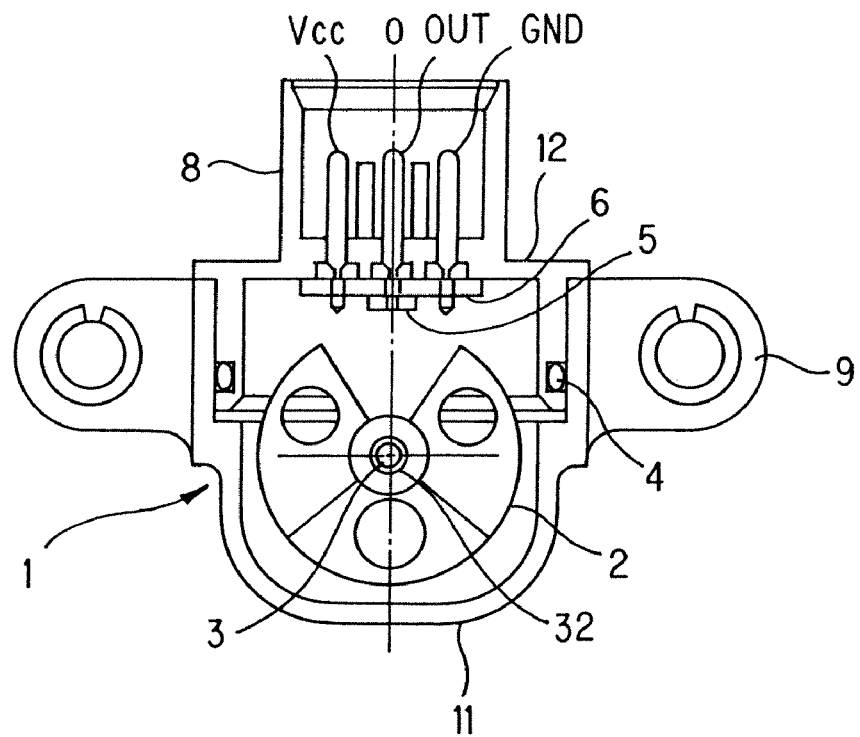
FIG. 1 is a front view of an inclination sensor according to an embodiment of the present invention.
Figure 2:
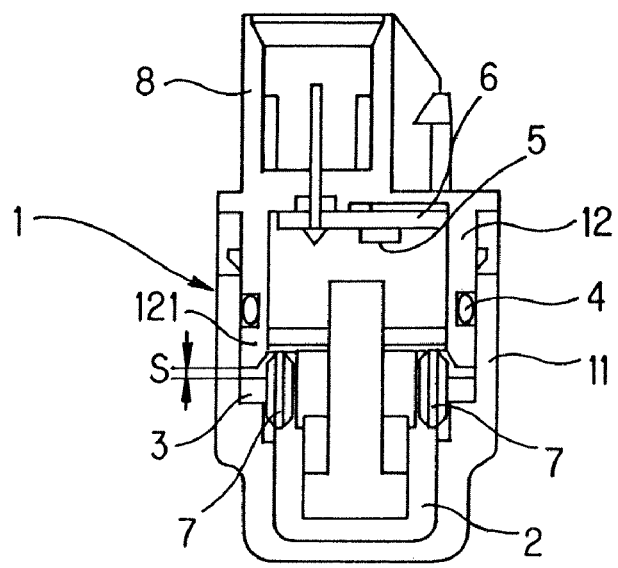
FIG. 2 is a side sectional view of the inclination sensor of FIG. 1.

In an inclination sensor according to the present invention, a magnetized pendulum movement 2 is freely supported by a shaft 3 so as to be rotatable in a case 1 as shown in FIGS. 1 and 2. The case 1 comprises a lower case 11 and an upper case 12. The lower case 11 is fitted with a seal ring 4 onto the upper case 12 and hook-jointed with each other to form a waterproof structure of the case 1. The upper case 12 is provided with a mounting plate 9 for securing to the vehicle body.

In the upper case 12, there is mounted a circuit board 6 implemented with a sensing circuit which can output a signal when a Hall IC 5 detects an inclined state of the movement 2 over a predetermined rotation angle and makes itself turned ON. The upper case is provided with a receptacle portion 8 integrally formed therewith for connection of terminals of a power supply source Vcc, an earth GND and an output from the circuit board 6.

Figure 3:
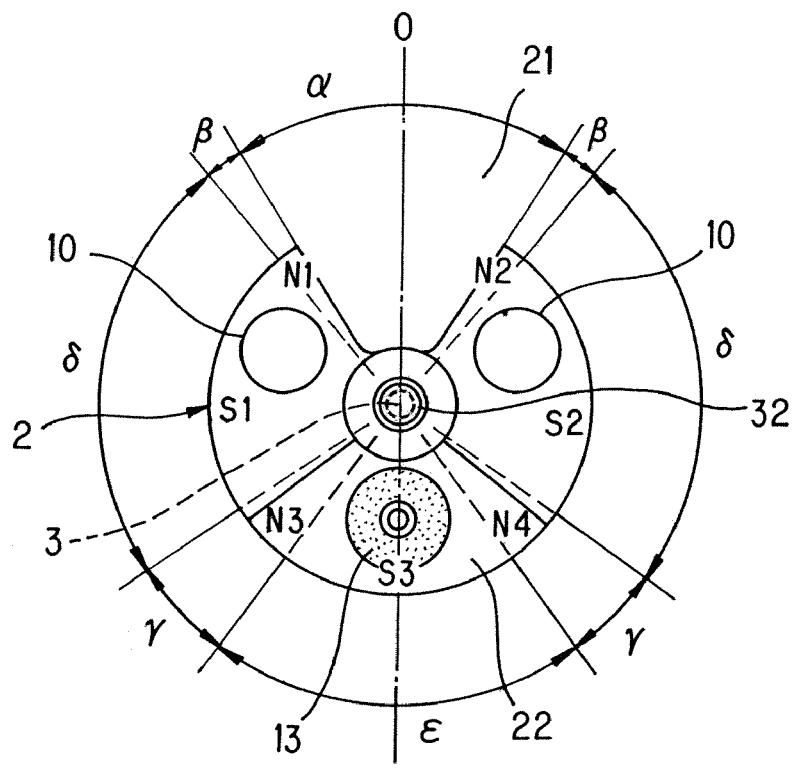
FIG. 3 is a front view showing the movement of the inclination sensor of the embodiment of FIG. 1.
Figure 4:
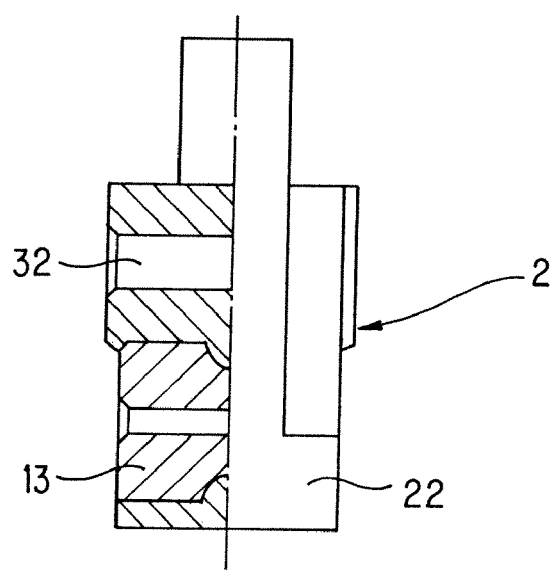
FIG. 4 is a side view of the movement of the inclination sensor shown in FIG. 3.

As shown in FIGS. 3 and 4, the movement 2 has a shaft hole 32 for inserting a shaft with a clearance and it is provided with an upper notched portion 21 having an aperture angle α (for example of 62 degrees) on both sides from a reference point (rotational midpoint) 0 and a lower balancing portion 22 for positioning the reference point 0 in a vertical direction.

A Hall IC 5 attached to the circuit board 6 is of the unipolar sensitive type, which is disposed on the reference point (rotational midpoint) 0 of the movement 2. The Hall IC turns ON when it detected an S-polar part of the magnetized movement 2 in its rotated state.

In the thus constructed sensor according to the present invention, the shaft 3 inserted with a clearance in a shaft hole 32 of the movement 2 is provided with spacers 7 loosely fitted one on both ends and mounted in the case 1, thereby the shaft 3 of the movement 2 has free ends with no restriction from the case 1. The spacers 7 also restrict the displacement of the movement 2 in the axial direction in the case 1.

Consequently, the shaft 3 having free ends with no restriction from the case 1 does not directly transmit the oscillation of the running vehicle to the movement 2, thereby improving the rotational movement of the movement 2.

Figure 6:
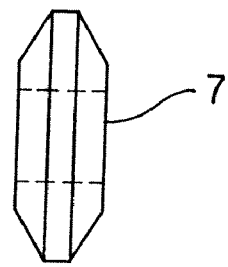
FIG. 6 is a side view of an exemplary spacer used in the inclination sensor according to the present invention.

As shown in FIG. 6, the spacer 7 has a "bead" shape so as to have a minimal surface for abutting on the movement 2 on the shaft. This can effectively prevent the occurrence of so-called "sticking" of the movement 2 to the spacer 7 even in the case the movement 2 was forced to the spacer when the case 1 was tilted in the direction reverse to that of rotation of the movement 2 at that time.

Figure 7:
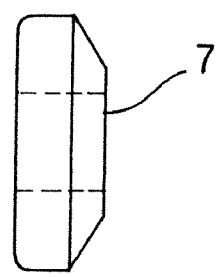
FIG. 7 is a side view of another exemplary spacer used in the inclination sensor according to the present invention.

It is of course possible to use a spacer 7 having a truncated cone shape (as shown in FIG. 7) or any other suitable shape having a reduced surface abutting on the movement 2.

The upper case 12 has cap parts 121 formed at its lower edge to enclose the upper half of both ends of the shaft body with a gap S to prevent the movement 2 from falling off the given position in the lower case 11.

According to the present invention, the weight ratio of the upper portion to the lower portion of the movement 2 relative to its shaft hole 32 is preset to a suitable value in a range of 1:9 to 3:7 so as to prevent the movement 2 from unstably swinging with oscillation of the running vehicle. The results of experiments made with a number of samples (movements 2) having different weight ratios of their upper portion to lower portion by applying a certain oscillation to them indicate that the samples having weight ratios of their upper portion to lower portion in a range of 1:9 to 3:7 could be sufficiently stable against the oscillation. The sample having the weight ratio of 2:8 achieved the best oscillation frequency characteristic. Namely, when the weight of the upper portion relative to the lower portion of the movement 2 is increased to exceed the above ratio, movement 2 becomes unstable with oscillation because the center of gravity of the movement 2 is displaced upward.

The weight ratio of the upper portion to the lower portion of the movement 2 may be adjusted by making holes 10 in the upper portion and/or embedding a weight 13 in the lower portion.

According to the present invention, since the movement 2 has the best suited weight ratio of its upper portion to lower portion about the rotation shaft 3, it can rotate with a proper moment in accordance of the inclination of the case 1 attached to the running vehicle without being affected by oscillation of the vehicle body.

Figure 9:
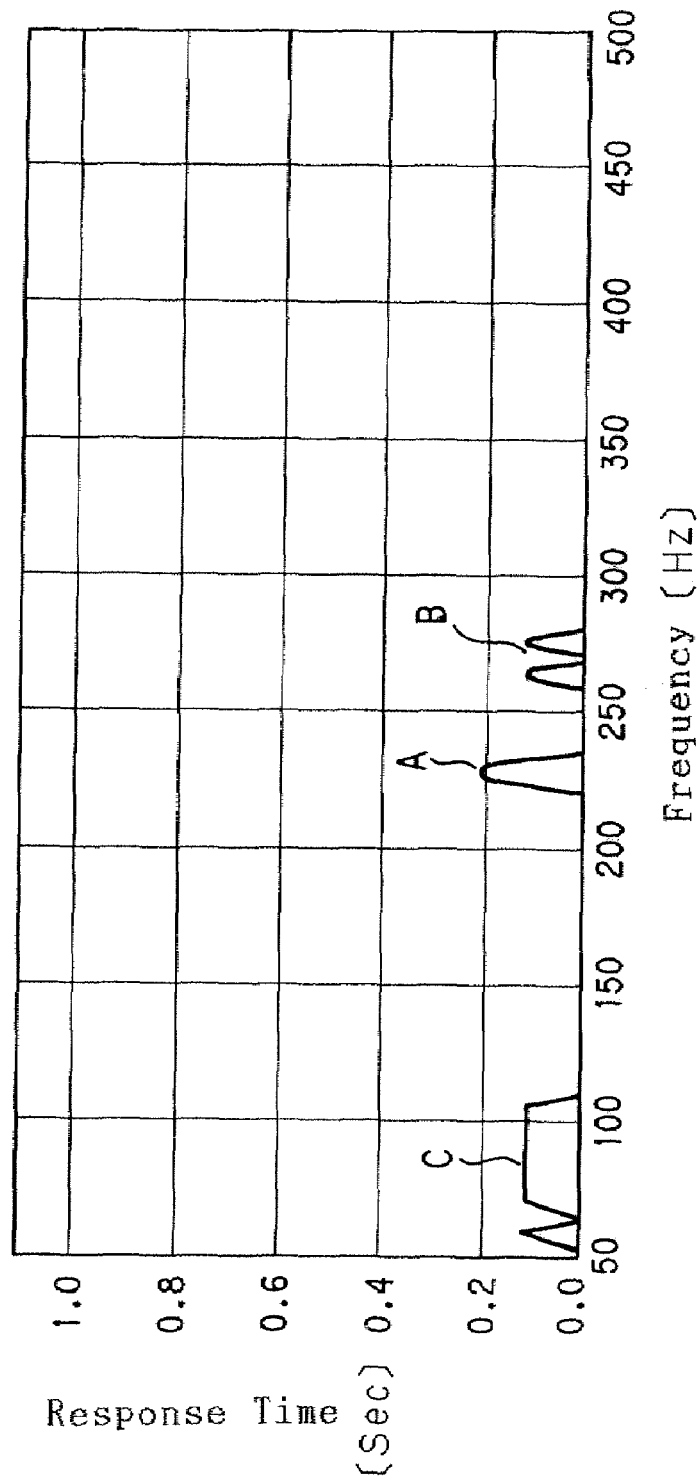
FIG. 9 shows an oscillation frequency characteristic of the movement of an inclination sensor according to the present invention.

FIG. 9 shows oscillation characteristic of the inclination sensor according to the present invention. The shown characteristics were obtained by the experiments with the sensor by applying oscillation in vertical, lateral and longitudinal directions at frequencies in a range of 50 to 500 Hz and a constant acceleration of 12 G. In FIG. 9, the characteristics A, B and C were determined by applying vertical oscillation, lateral oscillation and longitudinal oscillation respectively. The experimental results indicate that the inclination sensor according to the present invention can stably operate without considerable swinging and sticking of the movement and has stable oscillation characteristics in three oscillating directions: vertical, longitudinal and lateral.

Figure 10:
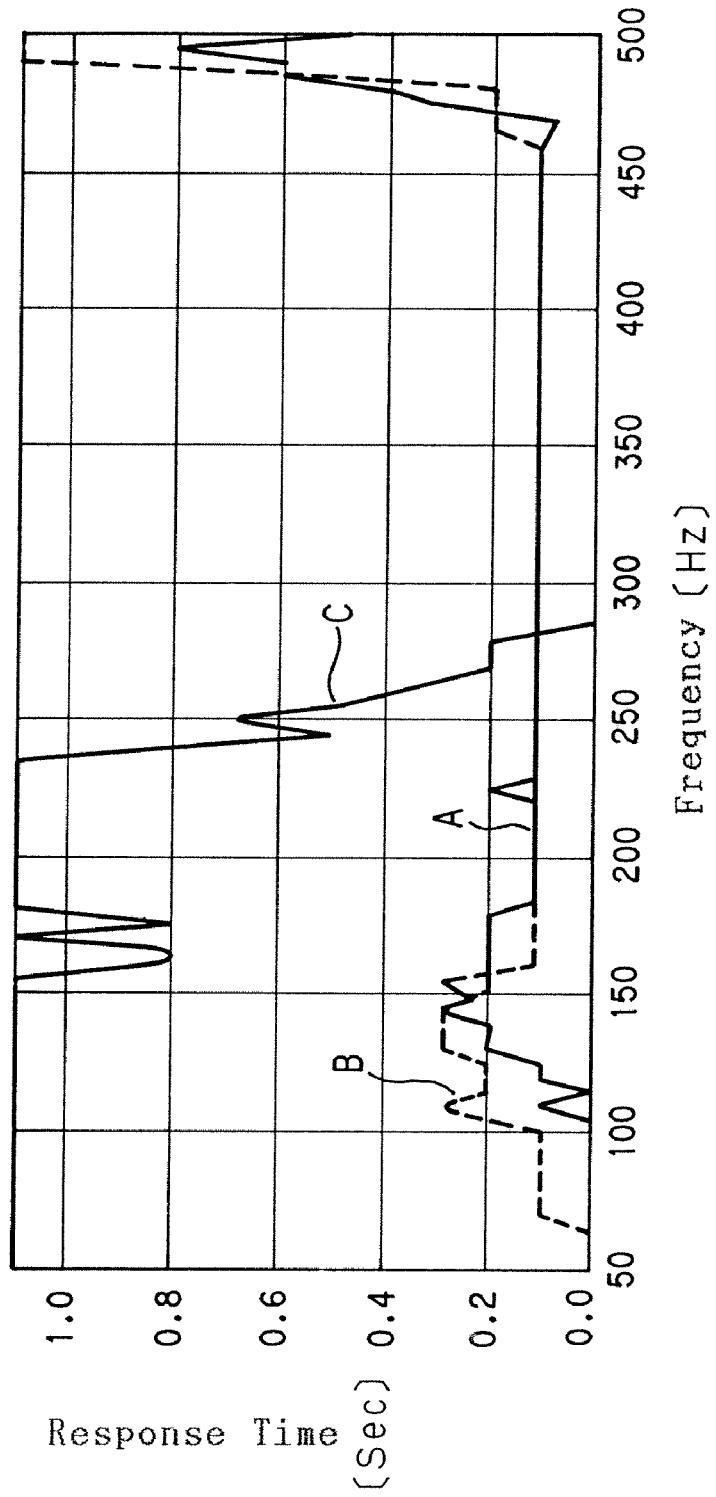
FIG. 10 is an oscillation frequency characteristic of the movement of a conventional inclination sensor.

FIG. 10 shows the oscillation characteristics of a conventional inclination sensor, which were obtained by experiments with the sensor which has a pendulum movement of 4:6 in weight ratio of its upper portion to lower portion, a movement shaft supported at both ends by bearing units of a case having ribs internally formed for restricting the axial movement of the movement. The experiments were carried out by applying vertical, lateral and longitudinal oscillations to the movement of the sensor under the same conditions.

The experimental results show that the movement considerably swings with vertical oscillation and lateral oscillation. In particular, the sensor is apt to delay in response to the longitudinal oscillation of high frequencies and suffers the sticking of the movement with the longitudinal oscillation of low frequencies.

According to the present invention, the movement 2 has an upper notched part 21 made at a relatively large aperture angle α so as to bring its rotational reference point 0 to a midpoint of the notched portion aperture. Therefore, the Hall IC does not respond to oscillation of the movement 2 within the aperture angle α.

Consequently, the sensor according to the present invention can work normally without erroneous actuation from the oscillation of the running vehicle and turns on its Hall IC only when the vehicle tilted at an angle exceeding a specified value.

Figure 5:
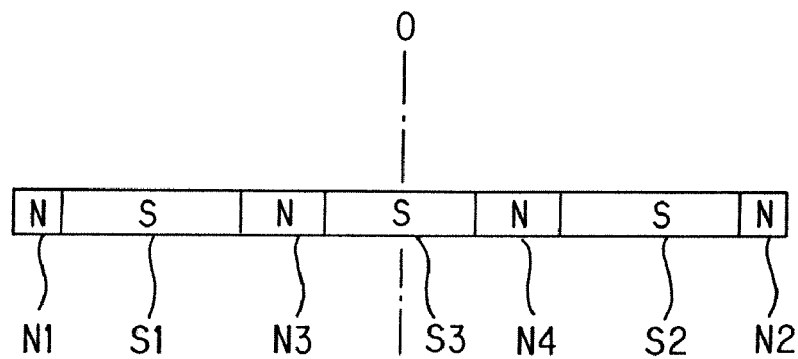
FIG. 5 is a development view showing a magnetized pattern of the movement.

The movement 2 has a plurality of differently pitched magnetized (polarized) parts disposed symmetrically on both sides at the reference rotational midpoint as shown in FIGS. 3 and 5. Namely, The movement 2 has minute N-pole parts (N1, N2 with an aperture angle β of, e.g. 7 degrees) disposed respectively on both side of the notched portion 21, minute N-pole parts (N3, N4 with an aperture angle γ of, e.g. 20 degrees) disposed respectively on both side of the circumference, S-pole parts (S1, S2 with a specified aperture angle δ of, e.g. 87 degrees) and an S-pole part (S3 with a specified aperture angle ε of, e.g. 70 degrees) respectively disposed between corresponding N-pole parts.

The movement having the differently pitched multiple polarized parts can provide a sharp change in magnetic flux density at the boundary between an N-pole part and an S-pole part. This enables the sensor to accurately preset a position of the movement when the movement 2 rotates by an angle exceeding the specified angle and the S-pole part of the moment is sensed by the Hall IC 5 which turns on at that time.

Figure 8:
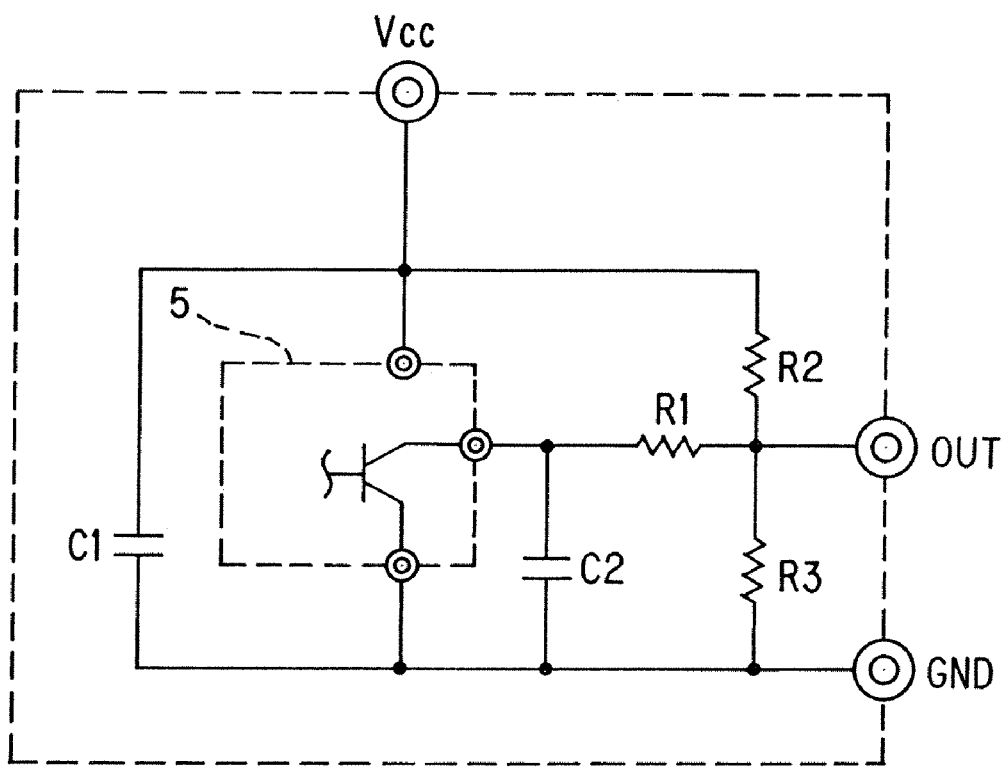
FIG. 8 is an electric circuit diagram of a sensor circuit of an inclination sensor used for detecting an inclination state of a vehicle according to the present invention.

FIG. 8 shows an exemplary sensor circuit for detecting an inclination (turnover) state of a running vehicle by turning on a Hall IC 5. The sensor circuit detects a rotation of the movement 2 exceeding a specified angle by turning on the Hall IC to output a high level detection signal. In the circuit diagram, a resistance RI and a capacitor C2 forms a low pass filter for protecting the Hall IC 5. A capacitor C1 is provided for preventing the occurrence of noise and oscillation.

According to the present invention, the movement 2 is magnetized in the pattern as shown in FIGS. 3 and 5 so as to detect the turnover of the vehicle by the Hall IC 5 when the vehicle turned 180 degrees.

Namely, the movement 2 is formed with a turnover sensitive area sensed by the Hall IC 5 when the vehicle turned 180 degrees at a rotational midpoint of the movement, minute non-sensitive areas (N-pole parts N3 and N4) disposed respectively on the both sides of the turnover sensitive area and not sensed by the Hall IC 5 and tilt sensitive areas (S-pole parts S1 and S2) disposed respectively adjoining to the non-sensitive areas and sensed by the Hall IC when the vehicle inclines to the right or the left.

When the vehicle turned 180 degrees, the turnover sensitive area (S-pole part S3) of the movement 2 disposed at the rotational midpoint faces to the Hall IC 5 by which the turnover state of the vehicle can therefore be reliably detected.

INDUSTRIAL APPLICABILITY

According to the present invention, it is possible to provide an inclination sensor for detecting a inclination state of a case by sensing by a magnetic sensor a magnetized portion of a pendulum type movement which can freely rotate in accordance with inclination of the case, wherein a shaft fitted with clearance in a rotation shaft hole of the pendulum is further provided at its both ends with a loosely fitted spacer and is rotatably mounted in supporting portions of the case, thereby the movement and the shaft are both in non-restricted condition and the movement can freely rotate without being restricted and affected by the oscillation of a running vehicle. The above-described construction of the sensor of the present invention can offer an essential advantage that the movement achieves smooth rotation in response to the inclination of a running vehicle with improved stability against the oscillation of the vehicle body by effectively reducing oscillation directly transmittable from the running vehicle with no need of using any additional vibration absorber.

According to the present invention, it is possible to provide an inclination sensor in which spacers having bead or frustum shape are loosely fitted on both ends of the shaft of the movement for limiting the axial displacement of the movement by abutting their reduced faces on the movement. This can effectively prevent the sticking of the movement to one of the spacers when the case tilts in a direction reverse to a swinging direction of the movement which is pressed at this time to one of the spacers.

According to the present invention, it is possible to provide an inclination sensor in which a pendulum type movement has an optimal weight ratio of its upper half to lower half about the shaft hole of the movement so as not to swing unstably to a large degree by the effect of oscillation of a running vehicle. This can reliably detect a tilted state of the running vehicle without being affected by the oscillation of the running vehicle.

What is claimed is:

1. An inclination sensor having a case incorporating a pendulum type movement rotatable therein in accordance with inclination thereof and a magnetic sensor for sensing a magnetized portion of the movement, wherein a shaft fitted with clearance in a shaft hole made in a rotational center of the movement is provided at both ends each with a spacer fitted with a clearance thereon and mounted in the ease to enable both the movement and the shaft to rotate in free condition;

wherein the spacer is shaped in the form of an abacus's bead or a frustum having a reduced face abutting on the movement.

* * * * *